US012295417B2

(12) United States Patent
Greim et al.

(10) Patent No.: US 12,295,417 B2
(45) Date of Patent: *May 13, 2025

(54) ELONGATE HEATER FOR AN ELECTRICALLY HEATED AEROSOL-GENERATING SYSTEM

(71) Applicant: Philip Morris USA Inc., Richmond, VA (US)

(72) Inventors: Olivier Greim, Villars-Burquin (CH); Julien Plojoux, Geneva (CH); Dani Ruscio, Cressier (CH)

(73) Assignee: PHILIP MORRIS USA INC., Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/532,299

(22) Filed: Dec. 7, 2023

(65) Prior Publication Data

US 2024/0108069 A1 Apr. 4, 2024

Related U.S. Application Data

(63) Continuation of application No. 17/888,787, filed on Aug. 16, 2022, now Pat. No. 11,871,788, which is a (Continued)

(30) Foreign Application Priority Data

Dec. 23, 2009 (EP) .................................... 09252900

(51) Int. Cl.
*A24F 40/46* (2020.01)
*A24D 1/20* (2020.01)
(Continued)

(52) U.S. Cl.
CPC ........... *A24F 40/46* (2020.01); *H05B 1/0244* (2013.01); *H05B 3/0014* (2013.01); *H05B 3/18* (2013.01);
(Continued)

(58) Field of Classification Search
CPC .. A24D 1/20; A24D 3/17; A24F 40/20; A24F 40/46; H05B 1/0244; H05B 3/0014; H05B 3/18; H05B 3/44; Y10T 29/49083
See application file for complete search history.

(56) References Cited

U.S. PATENT DOCUMENTS 5,498,855 A 3/1996 Deevi et al.
5,659,656 A 8/1997 Das
(Continued)

FOREIGN PATENT DOCUMENTS

CN 1126425 A 7/1996
EP 0358002 A2 3/1990
(Continued)

OTHER PUBLICATIONS

Search Report dated Jun. 7, 2010 for European Patent Appln. No. 09252900.7-2313.
(Continued)

*Primary Examiner* — Dana Ross
*Assistant Examiner* — James F Sims, III
(74) *Attorney, Agent, or Firm* — Harness, Dickey & Pierce, P.L.C.

(57) ABSTRACT

An electrically heated aerosol-generating system for receiving an aerosol-forming substrate includes a heating element including a first electrically conductive element electrically insulated from a second electrically conductive element by an electrically insulating portion. The first and second elements are elongate and are electrically connected to each other by an electrically resistive portion. At least one electrically conductive element and the electrically resistive portion are arranged such that they are at least partially in contact with the aerosol-forming substrate.

12 Claims, 5 Drawing Sheets

Related U.S. Application Data continuation of application No. 16/410,260, filed on May 13, 2019, now Pat. No. 11,425,935, which is a continuation of application No. 15/057,678, filed on Mar. 1, 2016, now Pat. No. 10,299,511, which is a continuation of application No. 14/543,317, filed on Nov. 17, 2014, now Pat. No. 9,282,773, which is a continuation of application No. 12/975,930, filed on Dec. 22, 2010, now Pat. No. 8,890,040.

(51) Int. Cl.

| | |
|---|---|
| ***A24D 3/17*** | (2020.01) |
| ***A24F 40/20*** | (2020.01) |
| ***H05B 1/02*** | (2006.01) |
| ***H05B 3/00*** | (2006.01) |
| ***H05B 3/18*** | (2006.01) |
| ***H05B 3/44*** | (2006.01) |

(52) U.S. Cl.

CPC ................. *H05B 3/44* (2013.01); *A24D 1/20* (2020.01); *A24D 3/17* (2020.01); *A24F 40/20* (2020.01); *Y10T 29/49083* (2015.01)

(56) References Cited

U.S. PATENT DOCUMENTS

| | | | | |
|---|---|---|---|---|
| 5,665,262 | A | 9/1997 | Hajaligol et al. | |
| 8,890,040 | B2 | 11/2014 | Greim et al. | |
| 10,299,511 | B2 | 5/2019 | Greim et al. | |
| 2012/0060853 | A1* | 3/2012 | Robinson | H05B 3/42 131/191 |
| 2022/0218023 | A1* | 7/2022 | Fuisz | A24F 40/60 |
| 2022/0312841 | A1 | 10/2022 | Diokno et al. | |
| 2022/0395024 | A1* | 12/2022 | Courbat | H05B 6/36 |
| 2024/0180235 | A1* | 6/2024 | Lee | A24D 1/045 |

FOREIGN PATENT DOCUMENTS

| | | | |
|---|---|---|---|
| EP | 438862 | A2 | 7/1991 |
| EP | 0488488 | A1 | 6/1992 |
| EP | 00532194 | A1 | 3/1993 |
| EP | 00628376 | A1 | 12/1994 |
| JP | S57-179292 | U | 11/1982 |
| JP | H08-511176 | A | 11/1996 |
| KR | 10-0244670 | B1 | 2/2000 |
| KR | 10-0393327 | B1 | 10/2003 |
| KR | 100636287 | B1 | 10/2006 |
| NZ | 306882 | A | 5/1999 |
| UA | 44246 | U | 9/2009 |
| UA | 88120 | C2 | 9/2009 |
| WO | WO-95/27411 | A1 | 10/1995 |
| WO | WO-95/27412 | A1 | 10/1995 |

OTHER PUBLICATIONS

Korean Office Action and English translation thereof dated Mar. 13, 2017.
Vietnam Office Action and English translation thereof dated Aug. 27, 2015.
Ukranian Office Action and English translation thereof dated May 5, 2014.
Singapore Office Acton and English translation thereof dated May 9, 2013.
Philippine Office Action dated Mar. 31, 2015.
Philippine Office Action dated Jun. 4, 2014.
Philippine Office Action dated Jan. 22, 2014.
International Search Report and Written Opinion dated Apr. 8, 2011.
New Zealand Office Action dated Mar. 11, 2013.
Mexican Office Action and English translation thereof dated Dec. 5, 2014.
Mexican Office Action and English translation thereof dated Jul. 4, 2014.
Korean Office Action and English translation thereof dated Jan. 24, 2018.
Korean Office Action and English translation thereof dated Mar. 13, 2013.
Korean Notice of Allowance and English translation thereof dated Sep. 26, 2017.
Japanese Office Action and English translation thereof dated Feb. 29, 2014.
Japanese Decision to Grant and English translation thereof dated Jul. 24, 2015.
Israel Office Action and English translation thereof dated Mar. 22, 2015.
Indonesian Office Action and English translation thereof dated Dec. 15, 2014.
Extended European Search Report dated Jun. 7, 2010.
Eurasian Office Action and English translation thereof dated Apr. 18, 2014.
Eurasian Office Action and English translation thereof dated Oct. 3, 2013.
Columbian Office Action and English translation thereof dated Jul. 26, 2013.
Columbian Office Action dated Dec. 27, 2013.
Chinese Office Action and English translation thereof dated Feb. 14, 2014.
Canadian Office Action dated Aug. 11, 2017.
Canadian Office Action dated Nov. 23, 2016.
Australian Office Action dated Oct. 29, 2015.
Korean Notice of Allowance and English translation thereof dated May 29, 2019.

* cited by examiner 106
105
109
103
102
145
V-
104
108
V+
147
117

119

R
e
d f
g 141
143
W

Y
X

T
a b

ELONGATE HEATER FOR AN ELECTRICALLY HEATED AEROSOL-GENERATING SYSTEM

CROSS-REFERENCE TO RELATED APPLICATIONS

This application is a continuation of, and claims priority under 35 U.S.C. § 120 to, U.S. application Ser. No. 17/888,787, filed Aug. 16, 2022, which is a continuation of U.S. application Ser. No. 16/410,260, filed May 13, 2019, which is a continuation of U.S. application Ser. No. 15/057,678, filed Mar. 1, 2016, which is a continuation application of U.S. application Ser. No. 14/543,317, filed Nov. 17, 2014, which is a continuation application of U.S. application Ser. No. 12/975,930 filed Dec. 22, 2010 which corresponds and claims priority under 35 U.S.C. § 119 to European Application No. 09252900.7, filed Dec. 23, 2009, the entire contents of each is hereby incorporated by reference.

WORKING ENVIRONMENT

EP-A-0 358 002 discloses a smoking system including a cigarette with a resistance heating element for heating tobacco material in the cigarette. The cigarette has an electrical connection plug for connection to a reusable, hand held controller. The hand held controller includes a battery and a current control circuit which controls the supply of power to the resistance heating element in the cigarette.

One disadvantage of such a proposed smoking system is that the hand held controller of the device is somewhat larger. In size than conventional smoking articles. This may be inconvenient for a user.

SUMMARY OF SELECTED FEATURES OF THE PREFERRED EMBODIMENT

In a preferred embodiment, an electrically heated aerosol-generating system for receiving an aerosol-forming substrate includes a heating element. Preferably, the heating element includes a first electrically conductive element electrically insulated from a second electrically conductive element by an electrically insulating portion. Also preferably, the first electrically conductive element and second electrically conductive element are elongate and are electrically connected to each other by an electrically resistive portion. Moreover, at least one electrically conductive element and the electrically resistive portion are arranged such that they are at least partially in contact with the aerosol-forming substrate.

Preferably, one end of at least one of the first or second electrically conductive elements forms a mounting portion of the heating element. Also preferably, the second electrically conductive element is electrically conductive tubing. The electrically conductive tubing at least partially surrounds the first electrically conductive element. Moreover, the electrically insulating portion is an electrically insulating plug. In the preferred embodiment, the electrically insulating portion at least partially surrounds one end of the first electrically conductive element. Preferably, the second electrically conductive element is shorter in length than the first electrically conductive element. Also preferably, the first electrically conductive element and the second electrically conductive element are substantially parallel.

In the preferred embodiment, the system also includes a sensor to detect air flow indicative of a user taking a puff or further including a temperature sensor.

In another embodiment, a heating element for heating an aerosol-forming substrate includes a first electrically conductive element electrically insulated from a second electrically conductive element by an electrically insulating portion. Preferably, the first and second elements are elongate and are electrically connected to each other by an electrically resistive portion. Also preferably, the at least one electrically conductive element and the electrically resistive portion are at least partially in contact with an aerosol-forming substrate.

In yet another embodiment, a heater for heating an aerosol-forming substrate in an electrically heated aerosol-generating system includes a holder and one or more heating elements. Preferably, the one or more heating elements include a first electrically conductive element electrically insulated from a second electrically conductive element by an electrically insulating portion. Also preferably, the first and second elements are elongate and re electrically connected to each other by an electrically resistive portion. Moreover, the at least one electrically conductive element and the electrically resistive portion are at least partially in contact with an aerosol-forming substrate. Preferably, a first end of each heating element forms a heating portion being exposed outside the holder and a second end of each heating element forms a mounting portion being mounted in the holder. Also preferably, the heater includes a connection for connecting the mounting portion of each heating element to a power supply to supply electric current through each electrically conductive element.

In still another embodiment, an electrically heated aerosol-generating system includes one or more heaters for heating a substrate to form an aerosol. Preferably, the heater includes a holder, one or more heating elements, and a connection for connecting the mounting portion of each heating element to a power supply to supply electric current through each electrically conductive element. Preferably, the heating element includes a first electrically conductive element electrically insulated from a second electrically conductive element by an electrically insulating portion. The first and second elements are elongate and are electrically connected to each other by an electrically resistive portion. Also preferably, the at least one electrically conductive element and the electrically resistive portion are at least partially in contact with an aerosol-forming substrate. In the preferred embodiment, a first end of each heating element forms a heating portion exposed outside the holder and a second end of each heating element forms a mounting portion being mounted in the holder.

In yet another embodiment, a method for manufacturing a heating element for heating an aerosol-forming substrate in an electrically heated aerosol-generating system includes the steps of: a) inserting a first end of an electrically conductive element into electrically conductive tubing, a second end of the electrically conductive element being exposed outside the tubing; b) providing an electrically insulating plug in the electrically conductive tubing, surrounding the first end of the electrically conductive element, the electrically conductive element and the electrically conductive tubing being elongate; and c) forming an electrically resistive portion electrically connecting the electrically conductive element to the electrically conductive tubing.

Preferably, step b) of providing an electrically insulating plug in the electrically conductive tubing, surrounding the first end of the electrically conductive element includes inserting electrically insulating paste into the electrically conductive tubing, to surround the first end of the electrically conductive element, the paste, when dry, forming the electrically insulating plug.

In yet another embodiment, a method for manufacturing a heater for heating an aerosol-forming substrate in an electrically heated aerosol-generating system includes the steps of: manufacturing one or more heating elements as disclosed herein, mounting the one or more heating elements in a holder, a heating portion of each heating element being exposed outside the holder, and connecting a mounting portion of each heating element to a power supply to supply electric current through each electrically conductive element.

BRIEF DESCRIPTION OF THE DRAWINGS

The invention will be further described, by way of example only, with reference to the accompanying drawings wherein like reference numerals are applied to like elements and wherein.

DETAILED DESCRIPTION

Figure 1:
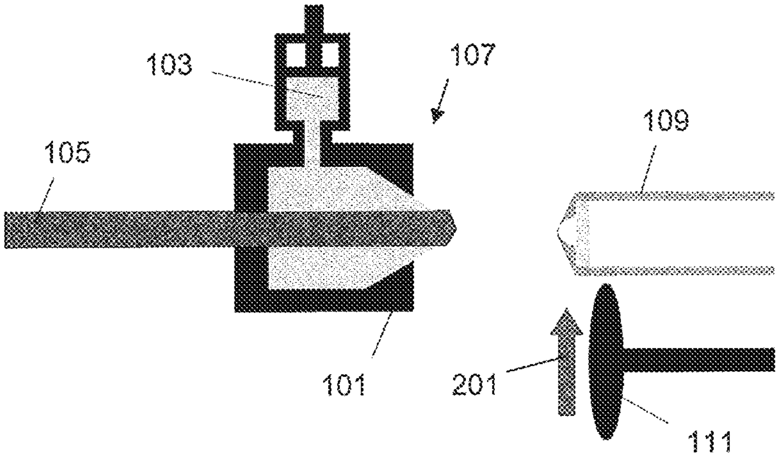
FIGS. 1 to 9 show sequential steps of one embodiment of the method of the invention, with FIG. 9 showing the resulting heating element according to a preferred embodiment.

In a preferred embodiment, a heating element, more particularly a heating element for heating an aerosol-forming substrate in an electrically heated aerosol-generating system, is provided. A method for manufacturing the heating element, and a method for manufacturing the heating element for heating an aerosol-forming substrate in an electrically heated aerosol-generating system is also provided.

In the preferred embodiment, there is provided an electrically heated aerosol-generating system for receiving an aerosol-forming substrate. Preferably, the system includes a heating element including a first electrically conductive element electrically insulated from a second electrically conductive element by an electrically insulating portion. Also preferably, the first and second elements are elongate and are electrically connected to each other by an electrically resistive portion. Moreover, at least one electrically conductive element and the electrically resistive portion are arranged such that they are at least partially in contact with the aerosol-forming substrate. Preferably the electrically heated aerosol-generating system is an electrically heated smoking system.

In another embodiment, a heating element for heating an aerosol-forming substrate includes a first electrically conductive element electrically insulated from a second electrically conductive element by an electrically insulating portion. Preferably, the first and second elements re elongate and are electrically connected to each other by an electrically resistive portion. In use, at least one electrically conductive element and the electrically resistive portion are arranged such that they are at least partially in contact with the aerosol-forming substrate. Preferably, the heating element may find application in heating many different kinds of substrate.

In the preferred embodiment, the electrically resistive portions may also be referred to as electrically resistive elements. Preferably, the electrically insulating portion may be an electrically insulating material such as mica powder (MiOx).

In use, the aerosol-forming substrate heats up more at the electrically resistive portion of the heating element than at the electrically conductive portions of the heating element. This allows for more precise control of the temperature profile of the aerosol-forming substrate when it is heated.

Preferably the heating element is an internal heating element or internal heater. As used herein, the term "internal heating element" or "internal heater" refers to one which can be at least partially inserted into or inside an aerosol-forming substrate. Preferably, the heating element is suitable for insertion into or within an aerosol-forming material. Alternatively, the heating element or heater may be an external heating element or heater. The term "external heating element" or "external heater" refers to one that at least partially surrounds the aerosol-forming substrate.

Preferably, the first electrically conductive element is an electrically conductive wire or plurality of wires. Preferably, the second electrically conductive element is electrically conductive tubing. This has the advantage that manufacture of the heating element is simplified.

Preferably, the electrically conductive tubing at least partially surrounds the first electrically conductive element. In the preferred embodiment, the second electrically conductive element is electrically conductive tubing, which at least partially surrounds the first electrically conductive element.

Preferably, the electrically insulating portion is an electrically insulating plug. The electrically insulating plug may surround a first end of the first electrically conductive element. In the preferred embodiment, the electrically insulating portion at least partially surrounds one end of the first electrically conductive element. In another embodiment, one end of the electrically conductive elements forms a mounting portion of the heating element.

Preferably, the first electrically conductive element is different in length to the second electrically conductive element. Also preferably, the second electrically conductive element is shorter in length than the first electrically conductive element. In the preferred embodiment, a first end of the electrically conductive element or elements forms a heating portion of the heating element. The electrically insulating portion may at least partially surround the first end of the first electrically conductive element. A second end of the electrically conductive element or elements may form a mounting portion of the heating element. The second end of the first electrically conductive element may project from the second end of the second electrically conductive element.

In the preferred embodiment, the first electrically conductive element and the second electrically conductive elements may be substantially parallel. Moreover, the electrically conductive elements may be substantially straight along or parallel to the longitudinal axis of the heating element.

Preferably, the electrically insulating portion is operable at a working temperature of up to about 700° C. Also preferably, the electrically insulating portion which may have the form of an electrically insulating plug of insulating material, may also be operable at a working temperature of up to about 800° C. Preferably, the operating or working temperature of the heating element may be about 250° C. More preferably the operating temperature of the heating element is about 300° C.

In the preferred embodiment, the electrically resistive portion may have a higher resistance than the electrically conductive elements.

Both the conducting portions (including the electrically conductive elements) and the electrically resistive portion of the heating element may be directly in contact with the aerosol-forming substrate. That is to say, in use, at least some of the aerosol-forming substrate touches an electrically conducting element and at least some of the aerosol-forming substrate touches the electrically insulating portion. Alternatively, the electrically conducting and electrically insulating portions of the heating element may be in indirect contact with the aerosol-forming substrate. For example, the electrically conductive portion and the electrically insulating portion may be separated from the aerosol-forming substrate by a paper surrounding the aerosol-forming substrate. In the case that the aerosol-forming substrate includes tobacco material, the paper may include cigarette paper which surrounds the cigarette.

Preferably, the electrically resistive portion is provided at a first end of the electrically conductive elements. Alternatively, the electrically resistive portion may be provided approximately half way along the length of the heating element. Furthermore, there may be two or three or four or more electrically resistive portions between the first end of the electrically conductive elements and the second end of the electrically conductive elements. The additional resistive portion or resistive element may be referred to as a resistive Junction.

The resistive portion or resistive junction between the electrically conductive element and the electrically conductive tubing may be formed by welding the element and tubing with electrodes or using a cutter such as pincers. That is to say the electrical connection at the resistive portion or resistive junction between the electrically conductive element and the electrically conductive tubing may be formed by welding the element and tubing with electrodes or using a cutter such as pincers.

In yet another embodiment, a heater for heating an aerosol-forming substrate in an electrically heated aerosol-generating system includes: a holder; one or more heating elements according to the second aspect of the invention, a first end of each heating element forming a heating portion being exposed outside the holder and a second end of each heating element forming a mounting portion being mounted in the holder; and a connection for connecting the mounting portion of each heating element to a power supply to supply electric current through each electrically conductive element. In the preferred embodiment, the heater may be a pin heater.

Preferably, the heater further includes insulating material around the mounting portions. Such insulating material may provide rigidity for the heater, and may also prevent a short circuit between electrically conductive tubing of the heating portion and the electrically conductive element of the mounting portion.

In yet another embodiment, an electrically heated aerosol-generating system including one or more heaters for heating the substrate to form an aerosol is provided. The electrically heated aerosol-generating system may include one or more pin heaters for heating the substrate to form an aerosol.

Preferably, the electrically heated aerosol-generating system further includes a power supply for supplying power to the heating elements. The electrically heated aerosol-generating system may include electrical hardware connected to the power supply and the mounting portion of each heating element.

The electrically heated aerosol-generating system according to various embodiments may further include a power supply or power source such as a rechargeable battery for supplying power to the heating elements. The power supply may be a power cell contained within the electrically heated aerosol-generating system. The power supply may be a lithium-ion (Lion) battery or one of its variants, for example a Lithium-ion polymer battery. Alternatively, the power supply may be a nickel-metal hydride (NiMH) battery or a nickel cadmium (NiCad) battery or a fuel cell. The system may further include electrical hardware connected to the power supply and the mounting portion of each heating element. Preferably, the electrically heated aerosol-generating system includes electrical hardware being programmable by software.

Preferably the electrically heated aerosol-generating system further includes a housing for receiving the aerosol-forming substrate. The housing may also include a shell.

Also preferably, the electrically heated aerosol-generating system further includes a sensor to detect air flow indicative of a user taking a puff or further includes a temperature sensor. The air flow sensor may be an electro-mechanical device. Alternatively, the air flow sensor may be any of: a mechanical device, an optical device, an opto-mechanical device and a micro electro-mechanical systems (MEMS) based sensor. Alternatively, the electrically heated aerosol-generating system may include a manually operable switch for a user to initiate a puff. The temperature sensor may detect the temperature of the heater or the temperature of the heating element or the temperature of the aerosol-forming substrate.

Preferably, the electrically heated aerosol-generating system further includes an indicator for indicating when the one or more heating elements are activated. The indicator may include a light, activated when the one or more heating elements are activated.

In yet another embodiment, a method for manufacturing a heating element for heating an aerosol-forming substrate in an electrically heated aerosol-generating system includes the steps of: a) inserting a first end of an electrically conductive element into electrically conductive tubing, a second end of the electrically conductive element being exposed outside the tubing; b) providing an electrically insulating plug in the electrically conductive tubing, surrounding the first end of the electrically conductive element, the electrically conductive element and the electrically conductive tubing being elongate; and c) forming an electrically resistive portion electrically connecting the electrically conductive element to the electrically conductive tubing.

In use, the electrically conductive tubing and the electrically resistive portion are both at least partially in contact with the aerosol-forming substrate. The heating element may include a heating portion and a mounting portion. The electrically conductive tubing, plug and first end of the electrically conductive element may together form a heating portion of the heating element. The exposed second end of the electrically conductive element may form a mounting portion of the heating element.

Preferably, the method provides a straightforward way in which to manufacture a heating element for use in an electrically heated aerosol-generating system. The electrically heated aerosol-generating system may include an electrically operated smoking system.

In the preferred embodiment, step b) of providing an electrically insulating plug in the electrically conductive tubing, surrounding the first end of the electrically conductive element includes providing the electrically insulating plug around the first end of the electrically conductive element and inserting the electrically insulating plug at the same time as step a) of inserting the first end of the electrically conductive element.

In an alternative embodiment, step b) of providing an electrically insulating plug in the electrically conductive tubing, surrounding the first end of the electrically conductive element includes inserting electrically insulating paste into the electrically conductive tubing, to surround the first end of the electrically conductive element, the paste, when dry, forming the electrically insulating plug. In that embodiment, preferably the step of inserting the electrically insulating paste into the electrically conductive tubing includes applying a pressure differential between one end of the tubing and the other end of the tubing. This may include drawing or sucking the electrically insulating paste into the tubing. Alternatively, or in addition, this may include pushing, pumping or injecting the electrically insulating paste into the tubing.

Preferably, the method further includes, after the step of inserting the electrically insulating paste into the electrically conductive tubing, the step of heating the paste to dry it to form the plug. The step of heating the paste may include blowing hot air on the conductive tubing and paste. Any other suitable means of heating may be used. The drying of the paste is preferably carefully controlled so that the resulting insulating plug has the correct density and structure and hence the correct insulating properties. The electrically insulating paste must be sufficiently fluid, plastic or elastic, to be inserted into the electrically conductive tubing. Preferably, the electrically insulating paste includes electrically insulating powder dissolved in a solvent, for example water. The type and consistency of material used for the paste will affect the properties of the heating element.

An electrically resistive portion may be created at the first end of the heating element by electrically connecting the electrically conductive element and the electrically conductive tubing at the first end of the electrically conductive element. Alternatively, or in addition, the step of creating at least one electrically resistive portion includes electrically connecting the electrically conductive element and the electrically conductive tubing to form electrically resistive elements at one or two or three or four or more points between the first end of the electrically conductive element and the second end of the electrically conductive element. These additional electrically resistive portions may be referred to as electrically resistive junctions.

Preferably, the step of inserting the first end of the electrically conductive element into the electrically conductive tubing includes inserting a portion of length L of the electrically conductive element into the electrically conductive tubing, L being the required length of the heating portion of the heating element. Alternatively, the method may further include the step of cutting the tubing, plug and first end of the electrically conductive element to form a heating portion of the required length L. In that case, the step of cutting may be combined with the step of creating a resistive portion or element at the extremity of the first end of the electrically conductive element.

Preferably, the exposed second end of the electrically conductive element has a length m. That is to say, the electrically conductive element projects from the electrically conductive tubing by a length m. m may be the required length of the mounting portion of the heating element. Alternatively, the method may further include the step of cutting the second end of the electrically conductive element to form a mounting portion of the required length m.

In still another embodiment, a method for manufacturing a heater for heating an aerosol-forming substrate in an electrically heated aerosol-generating system includes the steps of: manufacturing one or more heating elements according to the method of the fourth aspect of the invention; mounting the one or more heating elements in a holder, a heating portion of each heating element being exposed outside the holder; and connecting a mounting portion of each heating element to a power supply to supply electric current through each electrically conductive element.

Preferably, the method may further include the step of applying insulating material over the mounting portions.

Preferably, the holder includes a further heater, such as an end heater. The holder may surround the aerosol-forming substrate. The heating element may run through the middle of the aerosol-forming substrate.

Preferably, the aerosol-forming substrate includes a tobacco-containing material containing volatile tobacco flavor compounds which are released from the substrate upon heating. Alternatively, the aerosol-forming substrate may include a non-tobacco material. The aerosol-forming substrate may include tobacco-containing material and non-tobacco containing material.

Preferably, the aerosol-forming substrate further includes an aerosol former. Examples of suitable aerosol formers include, without limitation, glycerine and propylene glycol.

The aerosol-forming substrate is preferably a solid substrate. The solid substrate may include, for example, one or more of: powder, granules, pellets, shreds, spaghettis, strips or sheets containing one or more of: herb leaf, tobacco leaf, fragments of tobacco ribs, reconstituted tobacco, homogenised tobacco such as extruded tobacco, and expanded tobacco. The solid substrate may be in loose form, or may be provided in a suitable container or cartridge. Optionally, the solid substrate may contain additional tobacco or non-tobacco volatile flavor compounds, to be released upon heating of the substrate.

Optionally, the solid substrate may be provided on or embedded in a thermally stable carrier. The carrier may take the form of powder, granules, pellets, shreds, spaghettis, strips or sheets. Alternatively, the carrier may be a tubular carrier having a thin layer of the solid substrate deposited on its inner surface, or on its outer surface, or on both its inner and outer surfaces. Such a tubular carrier may be formed of, for example, a paper, or paper like material, a non-woven carbon fiber mat, a low mass open mesh metallic screen, or a perforated metallic foil or any other thermally stable polymer matrix.

The solid substrate may be deposited on the surface of the carrier in the form of, for example, a sheet, foam, gel or slurry. The solid substrate may be deposited on the entire surface of the carrier, or alternatively, may be deposited in a pattern in order to provide a non-uniform flavor delivery during use.

Alternatively, the carrier may be a non-woven fabric or fiber bundle into which tobacco components have been incorporated. The non-woven fabric or fiber bundle may include, for example, carbon fibers, natural cellulose fibers, or cellulose derivative fibers.

Further, as known to those skilled in the art, an aerosol is a suspension of solid particles or liquid droplets in a gas, such as air. The aerosol may be a suspension of solid particles and liquid droplets in a gas, such as air.

Preferably, the substrate forms part of a separate smoking article and the user may puff directly on the smoking article.

The smoking article may have a total length ranging from about 30 mm to about 100 mm. The smoking article may have an external diameter ranging from about 5 mm to about 13 mm. The smoking article may include a filter plug. The filter plug may be located at the downstream end of the smoking article. The filter plug may be a cellulose acetate filter plug. The filter plug is preferably about 7 mm in length, but can have a length ranging from about 5 mm to about 10 mm.

Preferably, the smoking article is a cigarette. In a preferred embodiment, the smoking article has a total length ranging from about 40 mm to about 50 mm. Preferably, the smoking article has a total length of about 45 mm. It is also preferable for the smoking article to have an external diameter of about 7.2 mm. Preferably, the aerosol-forming substrate includes tobacco. Further, the aerosol-forming substrate may have a length of about 10 mm. However it is most preferable for the aerosol-forming substrate to have a length of about 12 mm.

Further, the diameter of the aerosol-forming substrate may also range from about 5 mm to about 12 mm.

The smoking article may include an outer paper wrapper.

Further, the smoking article may include a separation between aerosol-forming substrate and the filter plug. The separation may be about 18 mm, but can be in the range of about 5 mm to about 25 mm.

The aerosol-forming substrate may alternatively be a liquid substrate. The aerosol-forming substrate may alternatively be any other sort of substrate, for example, a gas substrate, or any combination of the various types of substrate.

During operation, the substrate may be completely contained within the electrically heated aerosol-generating system. In that case, a user may puff on a mouthpiece of the electrically heated aerosol-generating system. Alternatively, during operation, the substrate may be partially contained within the electrically heated aerosol-generating system. The substrate may form part of a separate article and the user may puff directly on the separate article.

Preferably, the heating element is used as a heating needle, pin or rod that runs through the center of the aerosol-forming substrate. Such internal heaters are advantageous since thermal energy is delivered in situ, that is, directly to the aerosol former. The heat insulation barrier created by the aerosol-forming substrate can be reduced. Internal heaters also tend to substantially minimize condensation of the aerosol onto the heating elements, thereby substantially reducing required maintenance. The heating element may be used in conjunction with further heaters, for example a disk or end heater or a heating plate.

In the preferred embodiment, the heating element may be used to heat the aerosol-forming substrate by means of conduction. The heating element may be at least partially in contact with the substrate, or the carrier on which the substrate is deposited. Alternatively, the heat from the heating element may be conducted to the substrate by means of a heat conductive element. Alternatively, the manufactured heating element may transfer heat to the incoming ambient air that is drawn through the electrically heated aerosol-generating system during use, which in turn heats the aerosol-forming substrate by convection. The ambient air may be heated before passing through the aerosol-forming substrate or the ambient air may be first drawn through the substrate and then heated.

The electrically conductive element preferably includes a wire. The electrically conductive element is preferably metallic. In a preferred embodiment, the electrically conductive element is a copper wire. The electrically conductive element preferably has a generally circular cross section. However, the electrically conductive element may have any suitable cross sectional shape.

The electrically conductive tubing preferably includes metallic tubing. Preferably, the electrically conductive tubing includes a different material from the electrically conductive element. In the preferred embodiment, the electrically conductive tubing is stainless steel tubing. Alternatively, the electrically conductive tubing is Timetal® (a titanium based alloy) (Timetal® is a registered trade mark of Titanium Metals Corporation, 1999 Broadway Suite 4300, Denver, Colorado) or a nickel based alloy tubing. The electrically conductive tubing preferably has a generally circular cross section. However, the electrically conductive tubing may have any suitable cross sectional shape.

The electrically conductive tubing may have a generally circular cross section. Alternatively, the tubing may have a generally square, generally triangular or generally oval cross section. The cross-sectional area of the electrically conductive tubing may be greater than the cross sectional area of the electrically conductive element. In this case a substantially annular electrically insulating plug may be provided around the electrically conductive element, to form an electrical insulator between the internal electrically conductive element and the external electrically conductive tubing.

The relative dimensions of the electrically conductive element, the plug and the electrically conductive tubing will affect the properties of the heating element for example, but not limited to, the temperature increase of the heating element per unit of electrical power and the temperature increase per unit of heating element length.

In another embodiment, there is provided use of a heating element as a heating element to heat a substrate, in particular. In an electrically heated aerosol-generating system.

Features described in relation to one embodiment may also be applicable to another embodiment.

Referring to FIGS. 1 to 9, there is provided a filling chamber 101 holding insulating paste 103 and a first electrically conductive element. The first electrically conductive element may be a copper wire 105. The filling chamber 101 has a nozzle end 107. There is also provided a second electrically conductive element. The second electrically conductive element may be a substantially tubular electrically conductive tube 109, for receiving the copper wire. It should be noted that FIGS. 1 to 9 are not shown to scale.

In a first step shown in FIG. 1, the tube 109 is cut with a saw 111, as shown by arrow 201, to obtain a flat surface.

Figure 2:
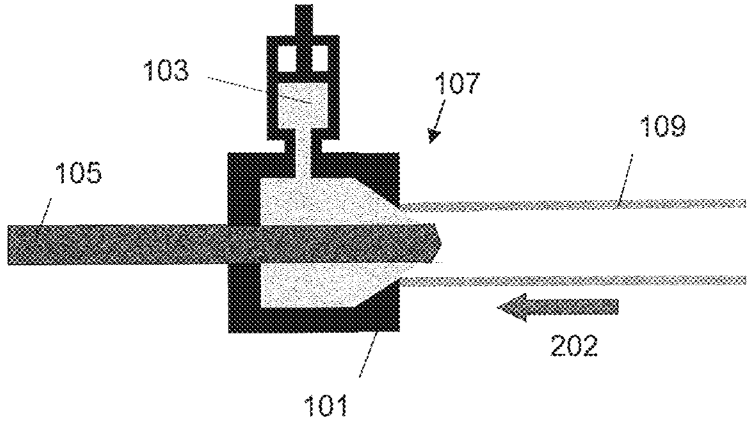

In a second step shown in FIG. 2, the sawn flat end of the tube 109 is held abutted to an outer wall of the filling chamber 101 as shown by arrow 202.

Figure 3:
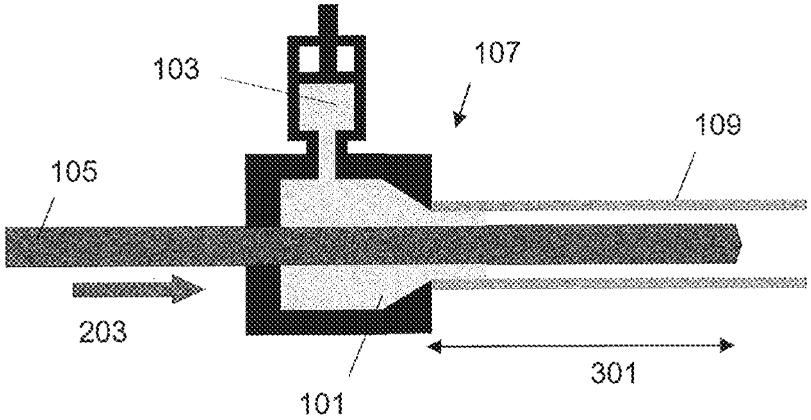

In a third step shown in FIG. 3, while the flat end of the tube 109 is maintained against the outer wall of the filling chamber 101, the copper wire 105 is moved towards and into the tube 109. This is shown by arrow 203. In this embodiment, the length 301 in FIG. 3 corresponds to the length required for the heating portion of the heating element, as will be discussed further below.

Figure 4:
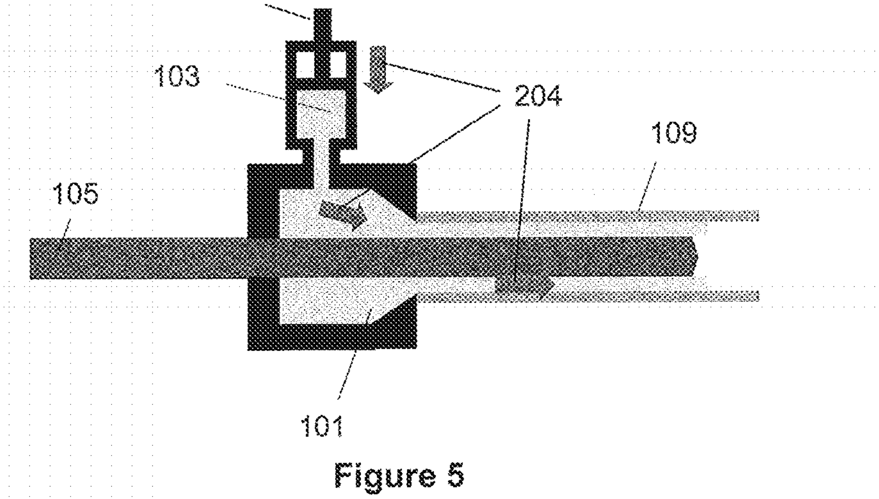

In a fourth step shown in FIG. 4, while the flat end of the tube 109 is maintained against the outer wall of the filling chamber 101, the paste 103 is inserted into the tube 109 to surround the copper wire 105. This is achieved by applying pressure to a plunger 401 of the filling chamber 101 as shown by arrows 204.

Figure 5:
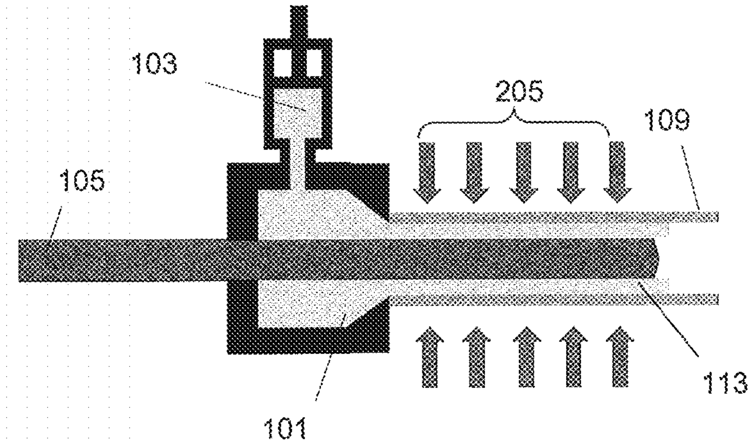

In a fifth step shown in FIG. 5, while the flat end of the tube 109 is maintained against the outer wall of the filling chamber 101, the tube 109 is heated so that the paste 103 dries to form a plug 113 as shown by arrows 205. In the preferred embodiment, the fourth and fifth steps may be carried out simultaneously.

Figure 6:
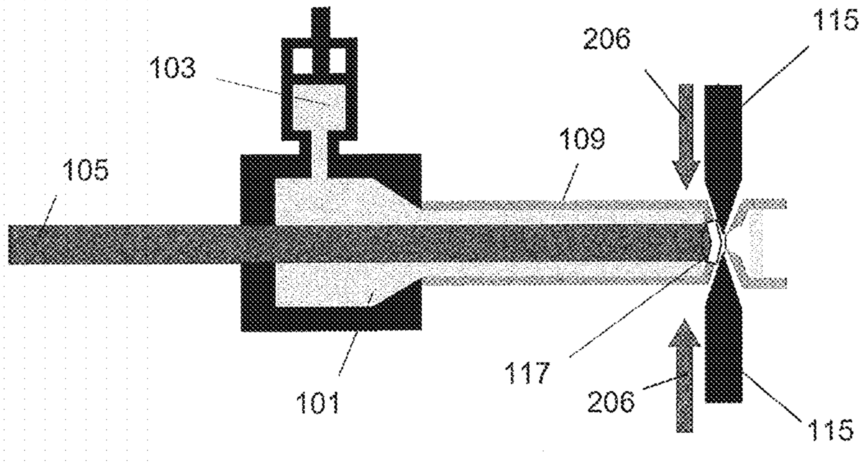

In a sixth step shown in FIG. 6, the end of the copper wire 105, the plug 113 and the tube 109 are cut with electrodes 115 to form the remote end of the heating portion of the heating element as shown by arrows 206. The cutting creates a first resistive portion or resistive element 117, which will be described in further detail below.

Figure 7:
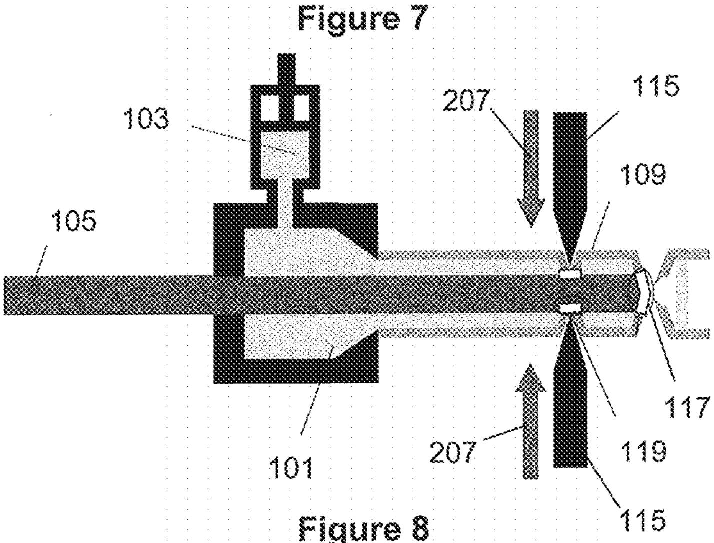

An optional seventh step is shown in FIG. 7, in which a further resistive portion or resistive element 119 is created using the electrodes 115 as shown by arrows 207. The further resistive portion 119 is an optional feature.

Figure 8:
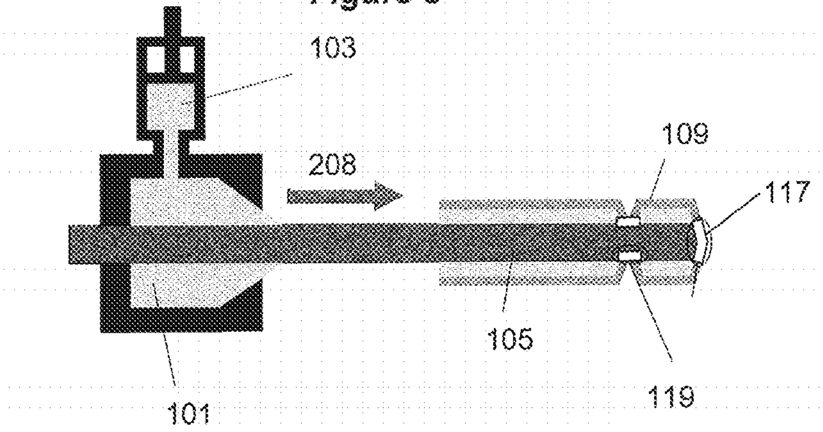

In an eighth step shown in FIG. 8, the flat end of the tube 109 is moved away from the outer wall of the filling chamber, exposing the copper wire 105 as shown by arrow 208.

Figure 9:
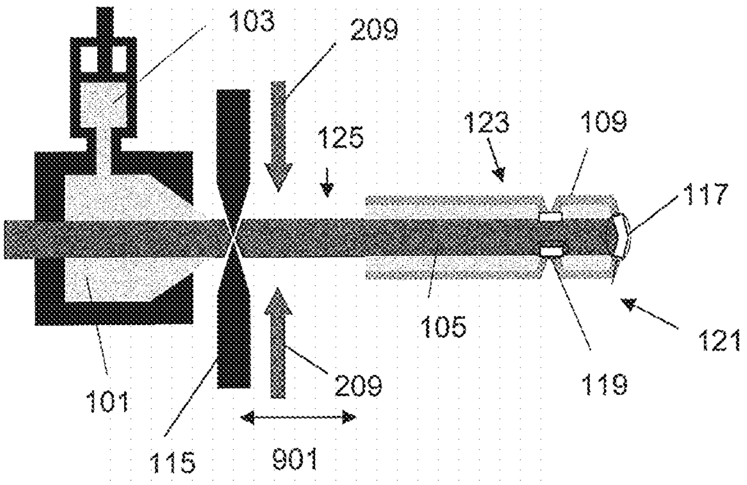

In a final ninth step shown in FIG. 9, the copper wire 105 is cut with electrodes 115 as shown by arrows 209. The resulting heating element 121 includes heating portion 123 and mounting and connection portion 125. The length 901 in FIG. 9 corresponds to the length required for the mounting and connection portion 125 of the heating element as will be discussed further below.

In the preferred embodiment, the paste 103 should be as thick as possible while still having a consistency to permit the paste to be inserted into the tube 109. The paste may be formed by dissolving an insulating powder in a solvent, for example, water. The insulating powder may be, for example but not limited to, MiOx, magnesium oxide, aluminium oxide, another metallic oxide or salt, or a combination of one or more of these. Additional material may also be included in the paste. When the paste is dry, it forms an electrical insulator. An electrical insulator is a dielectric material which largely does not allow electrical current to flow through it, up to a particular break down voltage. Electrical current starts to flow at the break down voltage. Mica may have a break down voltage of approximately 2000 $kVcm^{-1}$.

At the fifth step shown in FIG. 5, the tube 109 and paste 103 are heated to form plug 113. The heating may be by blowing hot air onto the tube 109 or by any other suitable means.

In the preferred embodiment, an air dryer may be used to dry the paste evenly along the length of the heating element. As the paste dries, some liquid may be lost from the paste and the paste may therefore shrink. Additional paste may be inserted into the electrically conductive tubing and the step of drying and inserting additional paste may be repeated as many times as necessary in order to completely fill the tubular heating element 109 with dry paste to form the plug 113.

Although copper wire is used in the above-described embodiment, wire of any other suitable metal could be used. Furthermore, the first electrically conductive element need not, in fact, be a wire. It may be any electrically conductive material. The electrically conductive element need not be circular or substantially circular in cross section. It may have any cross sectional shape, for example square, triangular or oval. Furthermore the first electrically conductive element may be a single strand of wire. Alternatively, the first conductive element may include a plurality of strands of wire. Examples of other suitable metals include gold, silver, platinum and titanium. In one embodiment, the copper wire measures about 30 mm in length by about 0.3 mm in diameter. The wire may be attached to a reel.

Preferably, the tube 109 may be a stainless steel tube. For example. the tube may be a syringe needle. The external diameter of the tube may be about 0.5 mm or 1 mm. In one embodiment, a BRA-4665643 needle supplied by Milian SA, Geneva, measuring about 120 mm in length by about 0.8 mm in diameter is used. In that case, the paste may be inserted into the tube at the fourth step by sucking the paste into the syringe needle. Alternatively, the tube 109 may be a Ti-Metal® tube.

In the embodiment described above, at the first step, a saw is used to cut the tube 109 to obtain a flat surface, which can be abutted to the filling chamber wall. The cutting may alternatively be done in another way, for example using a laser beam, a water jet or oxygen-assisted gas.

In addition, in the embodiment described above, in FIG. 6, electrodes 115 are used to cut the copper wire, tube and plug to form the first resistive portion 117. However, this cut may be done in another way for example using a pincer mechanism, with or without heat, using a laser beam, a water jet or oxygen-assisted gas. In addition, in the embodiment described above, in FIG. 7, electrodes 115 are used to create the second resistive portion. However, this may be done in another way for example using a pincer mechanism, with or without heat, using a laser beam, a water jet or oxygen-assisted gas. In addition, in the embodiment described above, in FIG. 9, electrodes 115 are used to cut the copper wire. However, this may be done in another way, such as using a pincer mechanism, with or without heat, using wire cutters, using a laser beam, a water jet or oxygen-assisted gas.

Furthermore, one of the electrically conductive elements need not, in fact, be tubular or substantially tubular. The electrically conductive element may be any electrically conductive material, provided that it may be electrically joined to the other electrically conductive element at the resistive portion. For example, the first electrically conductive element may be a substantially elongate strip of electrically conductive material. Further, the second electrically conductive element may be a substantially elongate strip of electrically conductive material.

Then, as previously described, the insulating paste may be injected between the first elongate strip and the second elongate strip. Then the paste may be dried as previously described. The paste should be sufficiently thick so that it does not leak out from between the two strips. This is because, unlike the embodiment in which the second electrically conductive element is tubular, there are no walls retaining the insulating paste during the manufacturing process. Then, as previously described, once the paste is dry, the first and second electrically conductive elements may be electrically joined to one another. The elements may be joined by forming a resistive portion at the first end of the elements by cutting and joining the two electrically conductive elements with electrodes 115 or with pincer cutters.

Figures 10, 11, 12, 13, 14, 15, 16, 17:
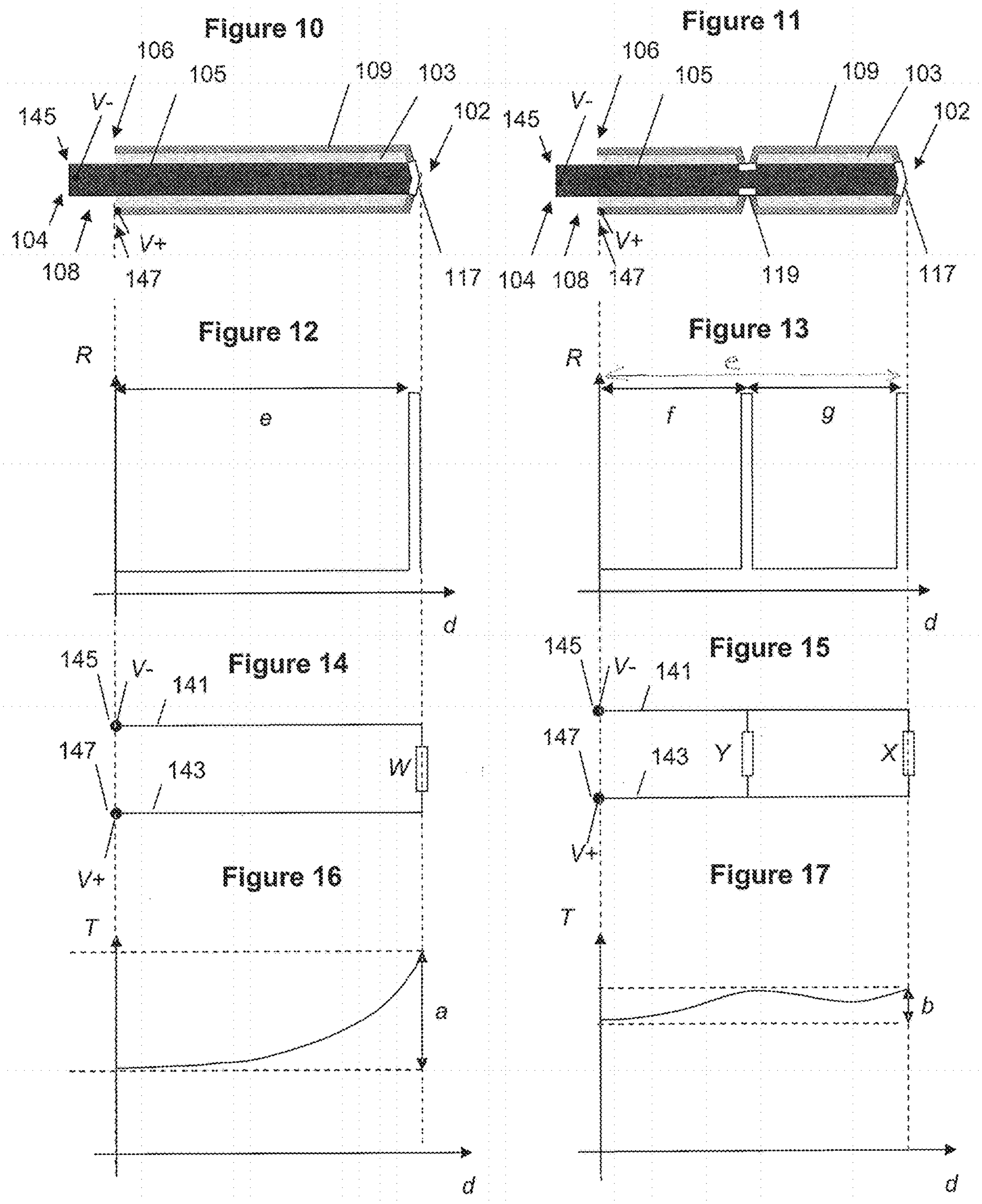
FIG. 10 shows a section through a heating element according to one embodiment of the invention.
FIG. 11 shows a section through a heating element according to another embodiment of the invention.
FIG. 12 is a schematic diagram showing the resistance of the heating element of FIG. 10, plotted as a function of distance along the heating element.
FIG. 13 is a schematic diagram showing the resistance of the heating element of FIG. 11, plotted as a function of distance along the heating element.
FIG. 14 is a schematic circuit diagram showing how one portion of the heating element of FIG. 10 has higher resistance than the rest of the heating element.
FIG. 15 is a schematic circuit diagram showing how more than one portion of the heating element of FIG. 11 has higher resistance than the rest of the heating element.
FIG. 16 shows a steady state temperature profile of the heating element of FIG. 10.
FIG. 17 shows a steady state temperature profile of the heating element of FIG. 11.

FIG. 10 shows a cross section through a heating element. The first end of the first and second electrically conductive elements is labelled 102. That is to say, the first end of the heating element is labelled 102. The second end of the first electrically conductive element is labelled 104, while the second end of the second electrically conductive element is labelled 106. The second end of the heating element is generally shown as 108. The total length of the first and second electrically conductive elements may be substantially equal. However, it is preferable for the first electrically conductive element to be longer than the second electrically conductive element. This allows the heating element to be mounted in a holder, as described below. The first electrically conductive element 105 may protrude from the second electrically conductive element 109.

As shown in FIG. 10, a first electrically conductive element 105, for example, a wire or elongate wire is at least partially surrounded by electrically insulating paste 103. The second electrically conductive element 109, for example, a tube surrounds the electrically insulating paste. Further the tube may at least partially surround the elongate wire. The first and second electrically conductive elements may be joined at the first end 102. A resistive portion 117 may be formed at the first end of the heating element, described in further detail below. In use, a voltage potential difference may be applied at the second end of the heating element. For example, a voltage V+ may be applied at the second end 106 of the second electrically conductive element, while a voltage V− may be applied at the second end 104 of the first electrically conductive element.

The resistance profile R of the heating element shown in FIG. 10 is shown as a function of distance d along the heating element in FIG. 12. This shows that the length of the second electrically conductive element, measured as the distance of the second electrically conductive element between its first and second ends, is e. In this diagram, the resistance R at the resistive portion of the heating element at the first end is higher than the resistance of the first and second electrically conductive elements not at the resistive portion, i.e., away from the first end of the heating element towards the second end of the heating element.

The electrically resistive portion 117 has a higher resistance than the first and second electrically conductive elements because there is an imperfect electrical connection at the first end of the heating element between the two electrically conductive elements. This is partly due to a small amount of electrically insulating paste which separates the first conductive element from the second conductive element in the electrically resistive portion of the heating element.

Further, an imperfect electrical connection is made because of oxides on the surface of the first and second electrically conductive materials. When the heating element is cut using the electrodes or pincers, the oxides separate the first electrically conductive element from the second electrically conductive element, thereby increasing the resistance of the heating element in the electrically resistive portion of the heating element.

The value of the resistance of the electrically resistive portion may be controlled by applying additional heat when cutting the heating element or forming the resistive portion. The higher the temperature applied to the resistive portion of the heating element when the heating element is cut or when the resistive junction is formed, the lower the resistance of the restive portion. When no heating is applied when the resistive portion is formed, the resistance is high.

FIG. 14 shows an electrical circuit diagram which is electrically equivalent to the heating element shown in FIG. 10. The resistive portion 117 has a resistance W. An electrical resistor allows electrical current to flow through it if a voltage difference is applied across its terminals. The resistor is an Ohmic component that produces a voltage drop V across it proportional to the current I flowing through it. That is to say $V=IR$, where R is referred to as the resistance of the resistor.

The resistive portion of the heating element is located at the first end of the heating element. The first electrically conductive element and second electrically conductive element are electrically equivalent to the wires 141, 143 shown in FIG. 14, which connect the resistive portion to the voltage source V+ and V− at terminals 145, 147 respectively.

FIG. 16 shows the steady state temperature profile T of the heating element as a function of the distance d along the electrical heating element. Because the resistance of the heating element at the first end is higher than the resistance of the heating element elsewhere, the heating element predominantly heats up at the first end, by the Joule heating effect, when electrical current flows. Heat then travels down from the hotter end of the heating element (at the first end) towards the second end of the heating element which is initially cooler than the first end of the heating element.

In an alternative embodiment, not shown in the figures, the resistive portion is not formed at the first end 102 of the heating element. The resistive portion may be formed a distance away from the first end 102 of the heating element. In that case, preferably, the resistive portion is formed half way along the length of the second electrically conductive material. That is to say that the resistive portion is formed a distance of 0.5e away from the first end 102 of the heating element, where e is, for example, the length shown in FIG. 12. This has the advantage that the steady state temperature profile of the heating element is substantially symmetric about the middle of the heating element, and leads to more even heating.

FIG. 11 shows a cross section through a heating element according to a further embodiment of the invention. In FIG. 11, the same reference numerals are used as in FIG. 10. In this embodiment, two resistive portions are formed in the heating element. The first resistive portion 117 may be formed at the first end 102 of the heating element. The second resistive portion 119 may be formed a distance g measured from the first end 102 of the heating element. That is to say, the second resistive portion is a resistive junction. The total length of the second electrically conductive element is referred to as e. The second resistive portion 119 is formed a distance f measured from the second end 106 of the second electrically conductive element. That is to say, the total distance $e=f+g$. Preferably, as shown in FIG. 13, the second resistive portion 119 is formed halfway along the length of the second electrically conductive element. That is to say $f=g=0.5e$.

FIG. 13 shows the resistance profile R of the heating element shown in FIG. 11 plotted as a function of distance d along the heating element. This shows that the length of the second electrically conductive element, measured as the distance of the second electrically conductive element between its first and second ends, is e. In this diagram, the resistance at the resistive portions of the heating element at the first end (resistive portion 117) and at a distance g measured from the first end of the heating element (resistive portion 119) is higher than the resistance of the first and second electrically conductive elements not at the resistive portions.

FIG. 15 shows an electrical circuit diagram which is electrically equivalent to the heating element shown in FIG. 11. This shows that the first resistive portion 117 is located at the first end of the heating element. As previously described a second resistive portion 119 is located a distance g away from the first end 102 of the heating element. The first resistive portion 117 has a resistance X, while the second resistive portion 119 has a resistance Y. The first electrically conductive element and second electrically conductive element are electrically equivalent to the wires 141, 143 shown in FIG. 15, which connect the resistive portions to the voltage source V+ and V− at terminals 145, 147 respectively.

FIG. 17 shows the steady state temperature profile T of the heater as a function of the distance d along the electrical heating element. Because the resistance of the first resistive portion 117 at the first end of the heating element and the resistance of the second resistive portion 119 is higher than the resistance of the heating element elsewhere, the heating element predominantly heats up at the first resistive portion and at the second resistive portion, by the Joule heating effect. Heat then travels down from the hotter parts of the heating element to the cooler parts of the heating element to form the steady state temperature profile shown in FIG. 17. Having two resistive portions has the advantage that a more even temperature distribution of the heating element is achieved.

Further, it is not necessary for the first resistive portion 117 to be formed at the first end of the heating element or for the second resistive portion 119 to be formed halfway along the length of the second electrically conductive element, e. For example the first resistive portion may be formed a distance e/3 away from the first end 102 of the heating element. The second resistive portion may be formed a distance 2e/3 away from the first end 102 of the heating element. That is to say that the second resistive portion may be formed a distance of approximately e/3 away from the second end of the second electrically conductive element. This has the advantage that an even more uniform temperature distribution is achieved. Any other suitable positioning of the first and second resistive portions may be provided.

Once the individual heating element has been produced, as in the exemplary embodiment described above with reference to FIGS. 1 to 9, one or more heating elements may be mounted on a metallic holder or electrically insulating holder to form a heater. Preferably, the one or more heating elements are first tested, for example using an infra red camera, or by measuring the voltage across the element.

In an exemplary embodiment, the mounting and connection portion 125 is mounted into a disc-like holder. The holder may be metallic or electrically insulating. The heating portion 123 is exposed above the metallic holder. Below the metallic holder, the mounting and connection portion 125 (copper wire 105) is connected to electrical circuitry. Thermo-resistance casting material is then applied to the back of the holder to mask the copper wire or wires. This provides rigidity for the heater but also prevents short circuits between the heating portion and the copper wire of the mounting and connection portion. If only one heating element is mounted in the holder, the heating element is located so as to most effectively heat the substrate. If more than one heating element is mounted in the holder, the heating elements are located in an appropriate arrangement so as to most effectively heat the substrate.

Figure 18:
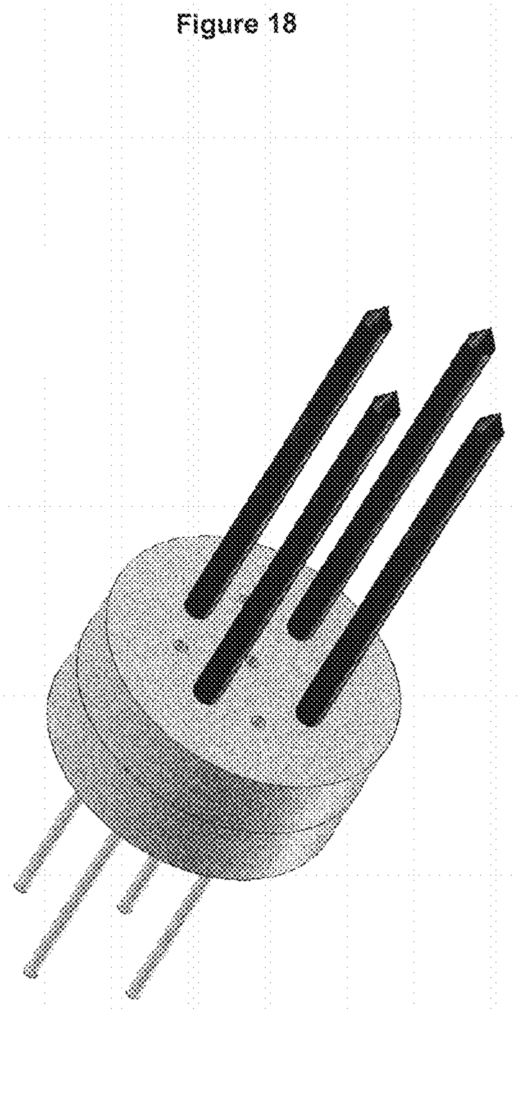
FIG. 18 shows four heating elements assembled into a substantially square array forming a heater according to an embodiment of the invention.

This is shown in FIG. 18 which shows four heating elements arranged in a generally square configuration or lattice in the holder. Other configurations such as hexagonal or triangular are also possible. The holder may include an outer portion for partially or completely surrounding the substrate. The holder may also include an additional heater, either independent of the heating elements or connected to the heating elements. The additional heater may be an end heater.

In this specification, the word “about” is often used in connection with numerical values to indicate that mathematical precision of such values is not intended. Accordingly, it is intended that where “about” is used with a numerical value, a tolerance of ±10% is contemplated for that numerical value.

In this specification the words “generally” and “substantially” are sometimes used with respect to terms. When used with geometric terms, the words “generally” and “substantially” are intended to encompass not only features which meet the strict definitions but also features which fairly approximate the strict definitions.

While the foregoing describes in detail a preferred elongate heater for an electrically heated aerosol-generating system with reference to a specific embodiment thereof, it will be apparent to one skilled in the art that various changes and modifications may be made to the elongate heater and equivalents method may be employed, which do not materially depart from the spirit and scope of the invention. Accordingly, all such changes, modifications, and equivalents that fall within the spirit and scope of the invention as defined by the appended claims are intended to be encompassed thereby.

We claim:

1. A heating element for heating an aerosol-forming substrate in an electrically heated aerosol-generating system, the heating element comprising:

an insulating portion;

a conductive portion; and an electrically resistive portion configured to be positioned to be inserted into a central portion of the aerosol-forming substrate of the electrically heated aerosol-generating system, the electrically resistive portion including at least a first part extending in a direction transverse to a longitudinal direction of the insulating portion, the electrically resistive portion contacting the conductive portion.

2. The heating element of claim 1, wherein a first end of the heating element is configured to penetrate a holder of the electrically heated aerosol-generating system.

3. The heating element of claim 2, wherein the first end of the heating element is connected to a power supply.

4. The heating element of claim 3, wherein the power supply is a lithium-ion battery.

5. The heating element of claim 1, wherein the conductive portion includes gold or silver.

6. The heating element of claim 5, wherein the insulating portion includes plastic.

7. The heating element of claim 6, wherein the electrically resistive portion has a higher resistance than the conductive portion.

8. The heating element of claim 1, wherein the electrically resistive portion is at an end of the heating element.

9. The heating element of claim 1, wherein the heating element is configured to directly contact a tobacco of the electrically heated aerosol-generating system.

10. The heating element of claim 1, wherein the heating element is configured to operate at about 300 degrees Celsius.

11. The heating element of claim 1, wherein the electrically resistive portion includes a second part extending from the conductive portion in the longitudinal direction of the insulating portion.

12. The heating element of claim 11, wherein the electrically resistive portion connects a first part of the conductive portion and a second part of the conductive portion.

* * * * *